Feb. 12, 1924.

L. RUBERT 1,483,484

ATTACHMENT FOR SEPARATORS

Filed May 5, 1923

Leigh Rubert
INVENTOR

BY Victor J. Evans
ATTORNEY

WITNESS:

Patented Feb. 12, 1924.

1,483,484

UNITED STATES PATENT OFFICE.

LEIGH RUBERT, OF FORESTBURG, SOUTH DAKOTA.

ATTACHMENT FOR SEPARATORS.

Application filed May 5, 1923. Serial No. 636,936.

*To all whom it may concern:*

Be it known that I, LEIGH RUBERT, a citizen of the United States, residing at Forestburg, in the county of Sanborn and State of South Dakota, have invented new and useful Improvements in Attachments for Separators, of which the following is a specification.

This invention relates to improvements in separators, the general object of the invention being to provide means for automatically draining the separator bowl as soon as the bowl ceases to rotate.

This invention also consists in certain other features of construction and in the combination and arrangement of the several parts, to be hereinafter fully described, illustrated in the accompanying drawings and specifically pointed out in the appended claim.

In describing my invention in detail, reference will be had to the accompanying drawings wherein like characters denote like or corresponding parts throughout the several views, and in which:—

Figure 1:
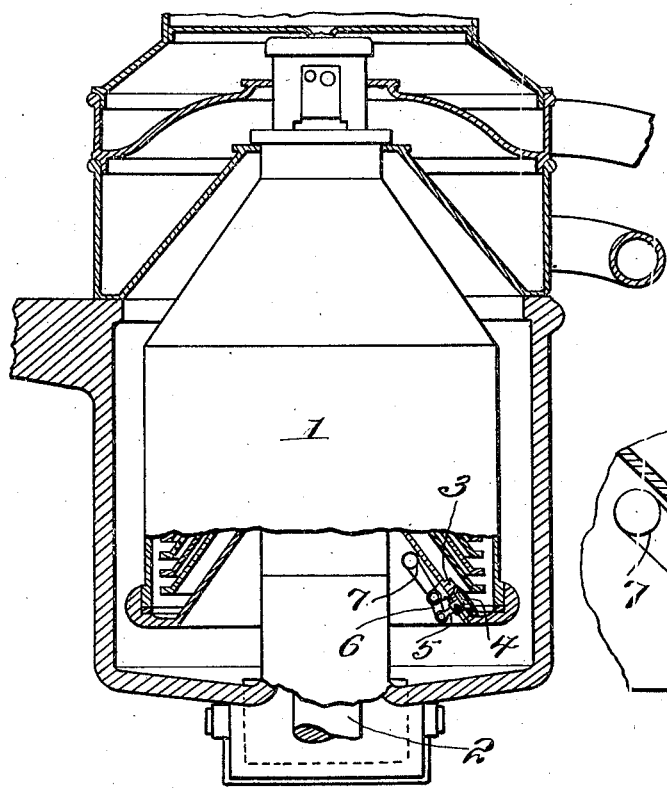
Figure 1 is a view of a separator bowl showing the invention in use.
Figure 3:
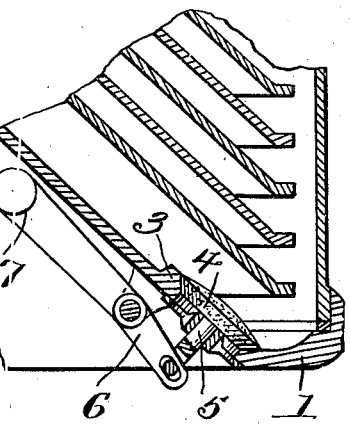
Figure 3 is a view showing the parts in closed position.
Figure 2:
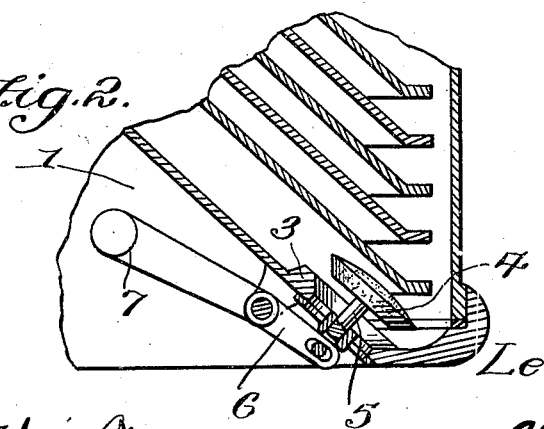
Figure 2 is a sectional detail view.

In these views 1 indicates the separator bowl and 2 the shaft which carries the same. In carrying out my invention I place a small outlet tube 3 in the bottom of the bowl so that the bowl will be drained of liquid by said tube when the same is opened. A valve 4 is arranged in the tube for closing the same, the stem 5 of the valve being connected to a pivoted lever 6, which is provided with a weight 7. The weight tends to hold the valve in open position but under the action of centrifugal force, when the bowl is to be rotated, the weighted lever will close the valve and hold the same closed as long as the bowl is rotated. As soon as the bowl comes to rest the weight will drop and thus open the valve so that any liquid in the bowl will drain therefrom. This invention will keep the bowl empty so that there is no danger of the same freezing up in cold weather or having the milk left therein become sour in hot weather.

While the invention is shown as used upon a milk separator it will of course be understood that it can be used on other centrifugal apparatus.

It is thought from the foregoing description that the advantages and novel features of my invention will be readily apparent.

I desire it to be understood that I may make changes in the construction and in the combination and arrangement of the several parts, provided that such changes fall within the scope of the appended claim.

What I claim is:—

In combination with a bowl of a centrifugal apparatus, a drain in the bottom thereof, a valve in the drain and a weight connected with the valve for holding the same open but closing the valve under the action of centrifugal force when the bowl is rotated.

In testimony whereof I affix my signature.

LEIGH RUBERT.